Dec. 31, 1940.   J. PURCELL   2,226,874
BRAKE ARRANGEMENT
Filed June 20, 1938   4 Sheets-Sheet 2
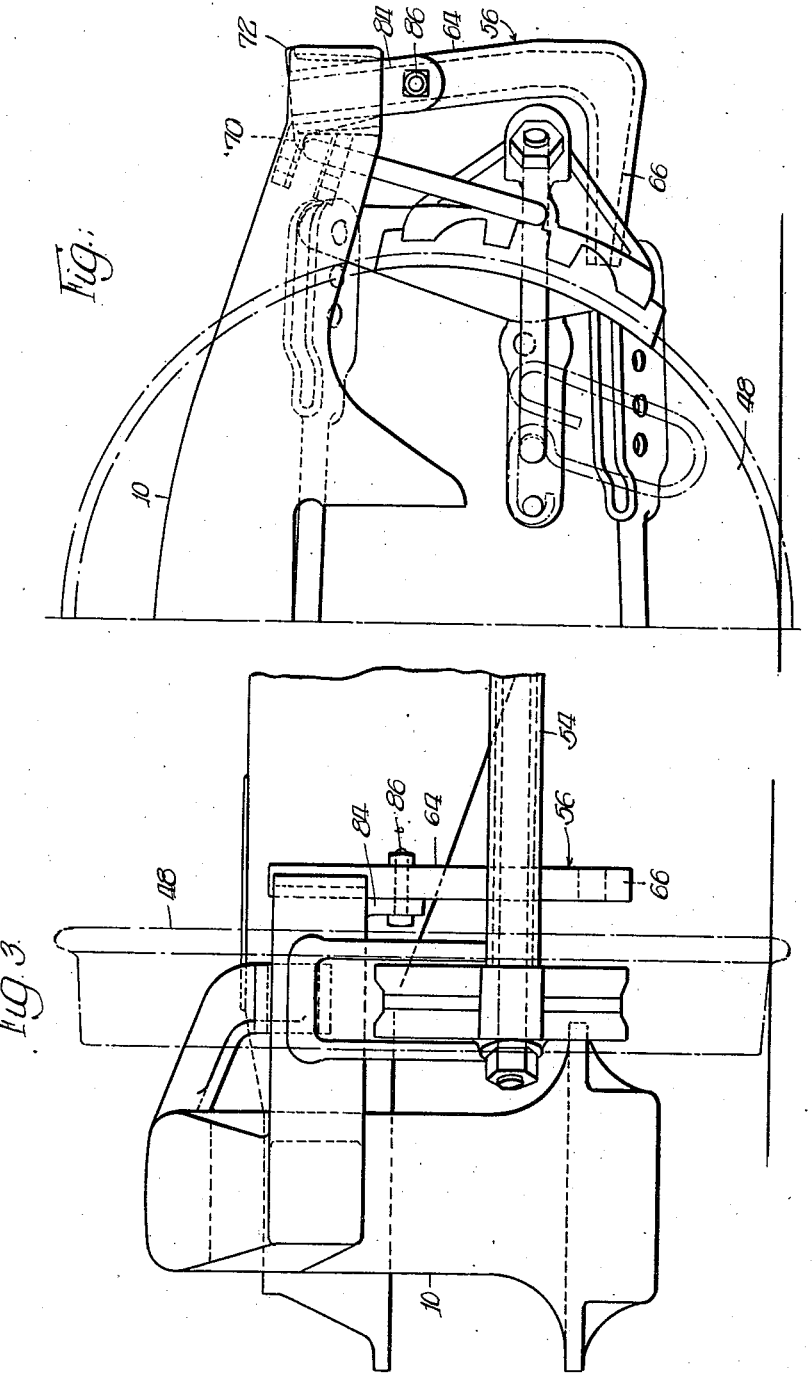
INVENTOR:
John Purcell,
BY
Wilkinson, Huxley, Byron & Knight
ATTORNEYS

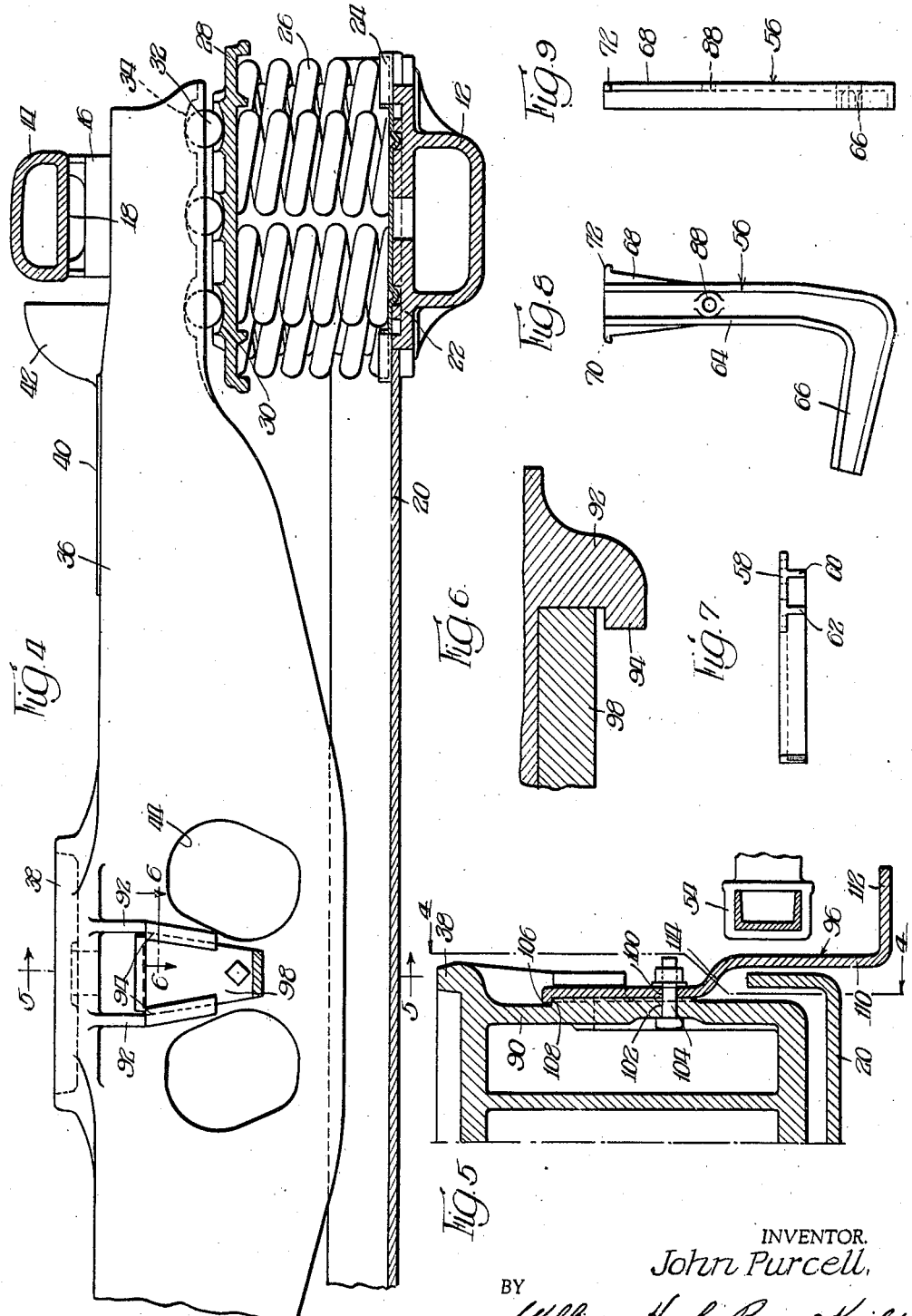

Dec. 31, 1940.     J. PURCELL     2,226,874
BRAKE ARRANGEMENT
Filed June 20, 1938     4 Sheets-Sheet 4
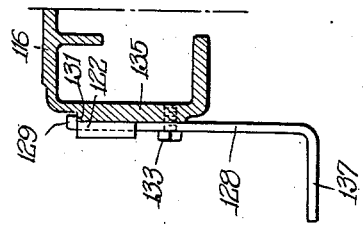
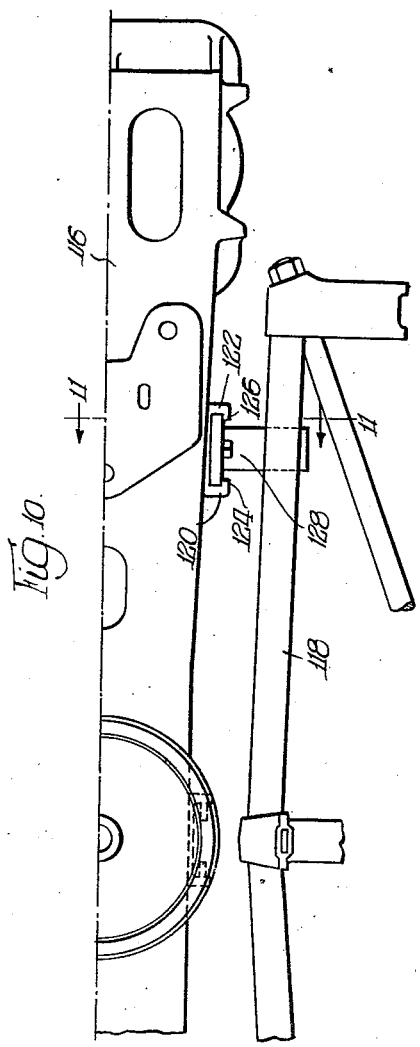
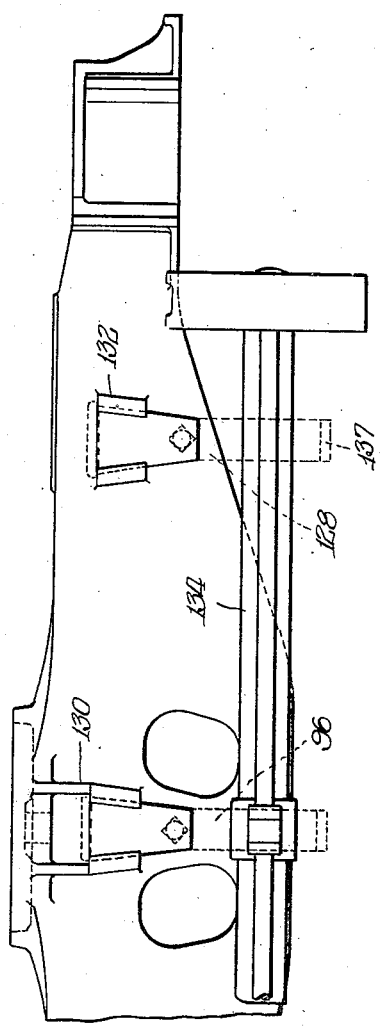
INVENTOR.
John Purcell,
BY
Wilkinson Huxley Byron & Knight
ATTORNEYS.

Patented Dec. 31, 1940

2,226,874

UNITED STATES PATENT OFFICE 2,226,874

BRAKE ARRANGEMENT

John Purcell, Chicago, Ill.

Application June 20, 1938, Serial No. 214,693

8 Claims. (Cl. 188—210)

The present invention relates to brake mechanism, and more in particular to brake beam safety guards for trucks.

Among the objects of the present invention is to provide a novel brake beam safety device, which is applicable to either a side frame, or load carrying member such as a bolster or the like, or both.

Another object of the present invention is to provide a brake beam safety device which is inexpensive to manufacture and apply and is readily removable for repair or replacement.

Still another object of the present invention is to provide a novel brake beam safety device for brake mechanism wherein a plurality of securing means is provided, but wherein only one means need be removed to permit replacement of said device.

A still further object of the present invention is to provide a novel brake beam safety device fixed to and movable with the movable load carrying member of a truck.

The present invention also comprehends the idea of providing a novel arrangement for connecting a brake beam safety member to either a load carrying member or the end of a side frame.

Still another object within the purview of the present invention is to provide a novel arrangement for brake beam safety members, such arrangement more particularly including the connection of brake beam safety members to the end of side frame end portions, which members are adapted to underlie an adjacent brake beam, and to use in combination therewith another brake beam safety member adapted to be connected adjacent the central portion of a load carrying member, such as a truck bolster, and underlie the adjacent brake beam to provide three points of support for the brake mechanism for safety purposes.

The invention also contemplates the idea of providing brake beam safety members secured at the end of end portions of side frames, in combination with spaced brake beam safety members suitably secured to a load carrying member such as a truck bolster, and which members are adapted to underlie the adjacent brake beams to provide four points of support for the brake mechanism for safety purposes.

It is still a further object of the present invention to provide a novel construction for a load carrying member, such as a truck bolster, whereby one or more brake beam safety members can be readily secured thereto to provide either the third or fourth points of support of safety means for the brake mechanism associated therewith.

Other objects, features, capabilities and advantages are comprehended by the invention, as will later appear and as are inherently possessed thereby.

Referring to the drawings:

Figure 2 is a fragmentary view in side elevation of the end of the truck disclosed in Figure 1 of the drawings and showing the construction of the brake beam safety device more in detail;

Figure 3 is a fragmentary view in end elevation of the mechanism disclosed in Figure 2 of the drawings;

Figure 4 is a transverse elevation partly in section of the bolster and side frame of the truck shown in Figure 1 of the drawings and is taken on line 4—4 of Figure 5;

Figure 5 is a transverse sectional elevation through the bolster, safety device and spring plank of the truck construction embodying the present invention, the same being taken substantially in the plane represented by line 5—5 of Figure 4 of the drawings;

Figure 6 is an enlarged view in cross section taken in the plane represented by line 6—6 of Figure 5 of the drawings;

Figure 7 is a top plan view of a brake beam safety member used in the present assembly and disclosed in Figures 1, 2 and 3 of the drawings;

Figure 8 is a view in side elevation of the brake beam safety member shown in Figure 7 of the drawings;

Figure 9 is a view in end elevation of the brake beam safety member shown in Figures 7 and 8 of the drawings;

Figure 10 is a fragmentary top plan view of a bolster and an associated brake beam, disclosing the use of brake beam safety members made in accordance with the present invention as fourth point supports for brake mechanism;

Figure 11 is a fragmentary view in cross section taken in the plane represented by line 11—11 of Figure 10 of the drawings; and Figure 12 is a fragmentary view in side elevation of a bolster with an associated brake beam, showing a construction for the former whereby either a third or fourth point support for brake mechanism can be connected thereto.

Figure 1:
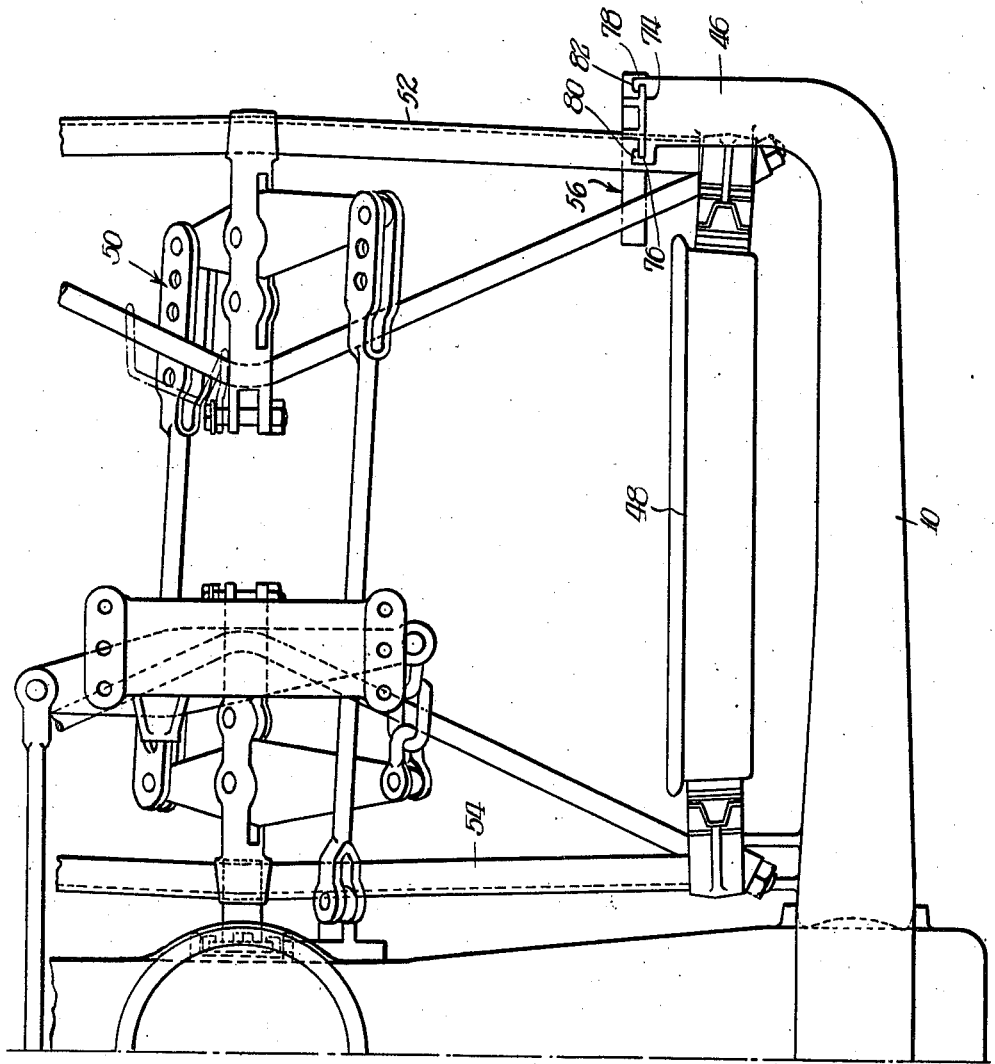
Figure 1 is a fragmentary top plan view of a truck including brake mechanism therefor and disclosing in association therewith brake beam safety means made in accordance with the present invention.

In the truck constructions illustrated, it will of course be understood that the assemblies on opposite sides of the truck and/or load carrying member may be the same, so only one side need be described.

In the embodiment shown in Figures 1 to 9 inclusive, illustrative of the present invention, the side frame 10 is provided with the tension member 12 and the compression member 14, the tension and compression members being connected by suitable struts, one of which is shown at 16 forming a window or bolster opening 18. The side frames on opposite sides of the truck are connected by means of a spring plank 20 extending between the windows and seated on the spring seat portion 22 of the tension member. The lower spring cap 24 is seated on said spring plank and spring seat 22 and supports the nest of springs 26 which, as shown, are of the coil type, although it is to be understood that they may be either of the elliptic or a combination of coil and elliptic type, such as shown in Kadel and Barrows Reissue Patent No. 18,266. The springs support the upper spring cap 28 which, in the construction shown, is provided with the spaced roller tracks 30 for accommodating the lateral motion rollers 32. The rollers supportingly engage suitable roller tracks 34 provided on the load carrying member 36 which, in the construction shown, is a bolster.

The bolster, as shown, is a box-shaped bolster, and is provided with the center bearing 38, side bearings 40 and transverse stops 42, and may be provided with the spaced apertures 44 for the unrestricted passage of brake rigging, this type of bolster being fully shown and described in Hedgcock Patent No. 2,029,822, granted February 4th, 1936.

The side frame which is described above in part is of the Vulcan type, and further includes the inwardly disposed end portions one of which, referred to as 46, is shown in the drawings.

Associated with the side frames on each side of the bolster are wheel and axle assemblies 48 with which is associated brake mechanism 50 of the type disclosed in Hedgcock application, Serial No. 72,894, filed April 6, 1936, now Patent No. 2,171,514, granted Aug. 29, 1939, although it is to be understood that any other brake mechanism may be used, as desired. This brake mechanism 50 includes the outer brake beam 52 disposed outwardly of the wheels and adjacent the inwardly disposed end portions 46 of the side frames, and an inner brake beam 54 disposed in substantially parallel relation to the bolster and between the wheels and said bolster.

The present invention is directed more in particular to brake beam safety devices for preventing dislodgment or displacement of the brake beams 52 and 54, and in the illustrative embodiment of the invention as shown in Figures 1 to 9 inclusive, such means comprises three points of support, one being disposed at the end of each of the end portions 46 of the side frames and the third point of support being adjacent the center of the bolster 36.

The point of support at each end of the end portions 46 of the side frame is provided by means of a member 56, as clearly shown in Figures 1, 2, 3, 7, 8 and 9, which comprises an elongated member formed with the web 58 and outwardly spaced reinforcing ribs or flanges 60 and 62. This member is formed with a part 64 adapted to extend substantially vertically with respect to the side frame, and a part 66 disposed laterally thereof. The part 64 is provided with a flared portion 68 having the laterally extending lugs 70 and 72. This brake beam safety member is received and secured in a pocket 74 provided at the end of the inwardly extending end portion 46 of the side frame, and which pocket is formed by ribs 76 and 78 which converge in a downward direction and which are provided with the inwardly disposed flanges 80 and 82, respectively. The pocket 74 is adapted to receive the flared portion 68 of the member 58 and to hold the same in locked position, the lugs 70 and 72 engaging the top of the ribs 76 and 78, respectively, to position said member 56. The end portion 46 of the side frame is provided with a depending flange 84 disposed adjacent the pocket 74 against which the member 56 abuts when disposed in the pocket 74 and said member 56 is secured and locked in position by means of a bolt and nut assembly 86 passing through an aperture in the flange 84 and an aperture 88 provided in the safety member in alignment therewith.

The bolster is provided on its side walls 90 with the spaced struts or ribs 92, the struts extending substantially vertically downwardly from the side of the center bearing, and the same at the lower portions thereof converging and being provided with the inwardly extending flanges 94 to provide a pocket for receiving a brake beam safety member 96 forming the third point of support for the safety mechanism. This safety member is provided with an upwardly diverging head 98 adapted to be received in the pocket formed by the ribs and flanges 92 and 94 and the head is further provided with a suitable aperture 100 adapted to register with the aperture 102 provided in the bolster side member 90, said members being adapted to accommodate securing means, such as the bolt and nut construction 104. The head is flanged as at 106 at its upper extremity, said flange being adapted to be supported on the ledge 108 provided on the bolster between the ribs 92.

The bottom portion 110 of the safety member extends downwardly and is flanged as at 112, which flanged portion is adapted to underlie the brake beam 54 which is disposed adjacent the bolster. The safety member 96, as more particularly shown in Figure 5 of the drawings, is offset as at 114 in order to provide suitable clearance with the spring plank 20 disposed immediately adjacent and below the bolster 36.

It will thus be appreciated that with the construction above described, the brake beam safety mechanism is inexpensive to make, apply and repair, when necessary, yet provides an effective three point support brake beam safety mechanism, two of which points are provided on the side frames and the third point being provided on the movable bolster, and all of which members forming said mechanism are at all times disposed to provide an emergency support for the brake beams when necessary.

When it is desired to provide a four point support brake beam safety mechanism, the bolster may be constructed in the manner disclosed in Figure 10 of the drawings. In this arrangement it is contemplated that the brake beam safety members 56 may be provided at the ends of the side frames, as described above, the remaining two points of support for the safety means being provided on the bolster 116 which is of the general type hereinbefore described, the same being disposed adjacent an inner brake beam 118 of brake mechanism associated with one of the wheel and axle assemblies of the car truck.

The bolster 116 in this embodiment at points adjacent the ends of brake beam 118 is provided with the spaced ribs 120 and 122 formed with the inwardly disposed flanges 124 and 126, respectively, such ribs converging downwardly to form a pocket corresponding to that disclosed in Figure 4 of the drawings, which is adapted to receive a brake beam safety member 128 corresponding to the safety member 96 of the previously described embodiment of the invention, as in Figure 5 of the drawings. This safety member 128 is formed with an inwardly disposed flange 129 engageable with a ledge 131 formed between the ribs 120 and 122 and the safety member is secured and locked in position as by means of a bolt 133 engaging the side wall 135 of the bolster, the safety member 128 being further provided with a flanged part 137 adapted to underlie the brake beam 118 providing an emergency support adjacent the end thereof.

It is to be understood that a safety member, such as 128, is provided adjacent each end of the brake beam 118 in order to provide two supports therefor which, in cooperative relation with the two points of support provided at the ends of the side frames, form a safety mechanism having four points of support for the inner and outer brake beams of the brake mechanism.

If desired, the bolster in the present truck assembly may be constructed to provide at its center a pocket 130 corresponding to the pocket disclosed in Figures 4 and 5 of the drawings, as well as to provide a pocket 132 on each side thereof, which pocket 132 corresponds to that as shown in Figure 10 of the drawings. With such construction, a single brake beam safety member, such as 96 as shown in dotted lines, may be secured thereto, or, as an alternative, two brake beam safety members, such as member 128 as shown in dotted lines, may be secured thereto, it being understood that in the former arrangement member 96 provides a third point of support and in the latter arrangement members 128 provided fourth point supports for brake beam safety mechanism.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. In a construction of the character described, the combination of a bolster, a brake beam disposed adjacent thereto, said bolster having a pair of converging ribs provided with inwardly disposed flanges, a ledge formed on said bolster adjacent said ribs, and a break beam safety member having a flared portion supported between said ribs and having a portion underlying said brake beam, the flared portion of said safety member having a flange supportedly engaging said ledge.

2. In a construction of the character described, the combination of a bolster, a brake beam disposed adjacent thereto, said bolster having a pair of converging ribs provided with inwardly disposed flanges, a ledge formed on said bolster between said ribs, a brake beam safety member having a flared portion supported between said ribs and having a portion underlying said brake beam, the flared portion of said safety member having a flange supportedly engaging said ledge, and means acting toward said bolster for securing said safety member to said bolster.

3. In a car truck, the combination of spaced side frames, a spring plank connecting said side frames, a bolster supported on said side frames, a brake beam disposed adjacent said spring plank, said bolster having a pair of converging ribs provided with inwardly disposed flanges, a ledge formed on said bolster between said ribs, a brake beam safety member having a flared portion supported between said ribs and having a portion underlying said brake beam, the flared portion of said safety member having a flange supportedly engaging said ledge, said safety member being offset to clear said spring plank, and means acting toward said bolster for securing said safety member to said bolster.

4. In a railway car truck, a bolster having upright wall structure, there being elements on said structure forming an upwardly and downwardly opening pocket, and a brake gear third point support device comprising an upright portion, with downwardly converging edges seated in said pocket, and extending downwardly through the open bottom of said pocket alongside of said structure and there secured to said bolster and then extending downwardly and outwardly from said bolster to underlie a brake beam.

5. In a railway truck, a truck frame, a spring plank carried thereby, springs on said spring plank, a bolster on said springs and having an upright wall structure including an upwardly facing ledge above said spring plank, said spring plank extending towards the end of the truck beyond the vertical plane of said wall structure, a brake beam suspended from said frame and substantially parallelling the edge of said spring plank but spaced therefrom longitudinally of the truck, and a brake gear support device comprising a bar having an upright arm with a flange seated on said ledge, there being fastening means spaced below said ledge and holding said arm to said wall and said flange to said seat, said bar being offset away from said wall structure below said means and extending downwardly between said spring plank and said brake beam and then extending longitudinally of the truck beneath said brake beam.

6. In a railway truck bolster, a side wall with a pair of downwardly converging ribs projecting outwardly therefrom and provided with inwardly disposed flanges extending towards each other and spaced from said wall, there being a horizontal ledge on said wall adjacent to said ribs, said ribs and ledge being constructed and arranged to cooperate in supporting a brake beam safety member.

7. In combination, a railway truck bolster including a side wall having a pair of downwardly converging ribs provided with inwardly disposed flanges facing each other and spaced from said wall, there being a horizontal ledge between said ribs, and a brake beam safety member having a flared portion supported between said ribs and behind said flanges, the flared portion of said safety member having a flange supportedly engaging said ledge, and means acting towards said bolster and spaced from said ledge and ribs for securing said safety member to said bolster wall.

8. A railway brake beam safety device comprising an upright part and a substantially horizontal part extending laterally from the lower portion of said upright part, the upper end of said upright part terminating in a horizontal flange and the side edges of said upper portion converging downwardly, said flange and edges being constructed and arranged to engage opposing elements on a truck part to support the device.

JOHN PURCELL.